US011772432B2

(12) United States Patent
Ishizaka et al.

(10) Patent No.: US 11,772,432 B2
(45) Date of Patent: Oct. 3, 2023

(54) ARITHMETIC MODEL GENERATION SYSTEM, WEAR AMOUNT ESTIMATION SYSTEM, AND ARITHMETIC MODEL GENERATION METHOD

(71) Applicant: TOYO TIRE CORPORATION, Hyogo (JP)

(72) Inventors: Nobuyoshi Ishizaka, Hyogo (JP); Sachiko Nakajima, Hyogo (JP); Satoshi Meguro, Hyogo (JP); Akio Yoshinari, Hyogo (JP); Tadashi Kuwahara, Hyogo (JP)

(73) Assignee: TOYO TIRE CORPORATION, Hyogo (JP)

( * ) Notice: Subject to any disclaimer, the term of this patent is extended or adjusted under 35 U.S.C. 154(b) by 131 days.

(21) Appl. No.: 17/470,402

(22) Filed: Sep. 9, 2021

(65) Prior Publication Data

US 2021/0402829 A1     Dec. 30, 2021

Related U.S. Application Data

(63) Continuation of application No. PCT/JP2020/011560, filed on Mar. 16, 2020.

(30) Foreign Application Priority Data

Mar. 29, 2019   (JP) .................................. 2019-069249

(51) Int. Cl.
  *B60C 11/24*     (2006.01)
  *B60C 23/04*     (2006.01)

(52) U.S. Cl.
  CPC ........ *B60C 11/246* (2013.01); *B60C 23/0416* (2013.01); *B60C 23/0479* (2013.01); *B60C 23/0488* (2013.01); *B60C 2200/04* (2013.01)

(58) Field of Classification Search
  CPC ............ B60C 23/0408; B60C 23/0496; B60C 23/061; B60C 23/0494; B60C 23/0416;
  (Continued)

(56) References Cited

U.S. PATENT DOCUMENTS 11,491,995 B2 * 11/2022 Ishigami ............... B60W 40/13
2006/0156790 A1   7/2006 Bocquillion et al.
(Continued)

FOREIGN PATENT DOCUMENTS

AU   2020286203 A1 *  7/2021 ............. B60B 11/00
DE   102013219662 B3    3/2015
(Continued)

OTHER PUBLICATIONS

European Search Report dated Nov. 9, 2022 in EP Application No. 20784643.7, 12 pages.
(Continued)

*Primary Examiner* — Andre J Allen
(74) *Attorney, Agent, or Firm* — Muncy, Geissler, Olds & Lowe, P.C.

(57) ABSTRACT

An arithmetic model generation system includes a tire information acquisition unit, a position information acquisition unit, a wear amount calculator, and an arithmetic model update unit. The tire information acquisition unit acquires tire data including a temperature and pressure of a tire. The position information acquisition unit acquires position data for a vehicle on which the tire is mounted. The wear amount calculator includes an arithmetic model that generates an estimated wear amount of at least one groove of the tire, the wear amount calculator calculating the estimated wear amount of at least one groove of the tire by using the arithmetic model by inputting the tire data and the position data. The arithmetic model update unit updates the arithmetic model based on a wear amount measured by a tire
(Continued)

measurement device external to the vehicle and the estimated wear amount.

10 Claims, 5 Drawing Sheets

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 11/246; B60C 23/0467; B60C 23/0498; B60C 23/02; B60C 99/006; B60C 23/0428; B60C 23/0442; B60C 2319/004; B60C 23/009; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 23/0481; B60C 11/0318; B60C 23/0459; B60C 23/0471; B60C 2019/005; B60C 23/002; B60C 23/042; B60C 2200/02; B60C 23/0422; B60C 23/0423; B60C 23/0466; B60C 23/0477; B60C 13/001; B60C 23/0405; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/0486; B60C 23/065; B60C 23/00336; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 99/00; B60C 11/03; B60C 23/005; B60C 23/0432; B60C 25/007; B60C 3/00; B60C 5/14; B60C 11/11; B60C 17/04; B60C 17/06; B60C 23/063; B60C 23/10; B60C 25/0554; B60C 25/14; B60C 29/062; B60C 99/003; B60C 11/032; B60C 11/12; B60C 1/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 15/06; B60C 25/056; B60C 29/005; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 19/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 2015/0617; B60C 2015/0678; B60C 23/085; B60C 25/0548; B60C 25/185; B60C 7/107; G01M 17/02; G01M 17/022; G01M 17/027; G01M 17/021; G01M 17/024; G01M 17/025; G01M 17/013; G01M 17/007; G01M 1/045; G01M 1/326; G01M 17/06; G01M 1/02; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/03; G01M 17/08; G01M 5/0091; G01M 1/365; G01M 13/04; G01M 5/0066; G01M 1/08; G01M 1/22; G01M 13/027; G01M 5/0033; G01M 1/00; G01M 1/122; G01M 15/044; G01M 17/00; G01M 3/24; G01M 3/2878; G01M 5/0078; G01M 1/06; G01M 1/12; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

2015/0231932 A1   8/2015   Singh
2015/0239298 A1   8/2015   Kretschmann

(56) References Cited

U.S. PATENT DOCUMENTS

| | | | |
|---|---|---|---|
| 2017/0023441 A1 | 1/2017 | Luk et al. | |
| 2017/0113495 A1* | 4/2017 | Singh | B60C 11/246 |
| 2018/0178590 A1 | 6/2018 | Lee | |
| 2018/0272813 A1 | 9/2018 | Singh | |
| 2020/0182746 A1* | 6/2020 | Singh | G01P 15/18 |
| 2020/0398617 A1* | 12/2020 | Kandler | B60C 23/0455 |
| 2021/0061022 A1* | 3/2021 | Singh | B60C 11/243 |
| 2021/0402829 A1 | 12/2021 | Ishizaka et al. | |
| 2022/0274452 A1* | 9/2022 | Hasegawa | B60W 40/068 |
| 2023/0123850 A1* | 4/2023 | Takezawa | B60T 8/172 73/146.5 |

FOREIGN PATENT DOCUMENTS

| | | | |
|---|---|---|---|
| DE | 102013220882 A1 | 4/2015 | |
| DE | 102017204648 A1 | 9/2018 | |
| EP | 2982521 A1 * | 2/2016 | B60C 11/243 |
| EP | 4124472 A1 * | 2/2023 | |
| JP | 2008143460 A | 6/2008 | |
| JP | 2016034826 A | 3/2016 | |
| JP | 2018158722 A | 10/2018 | |
| JP | 2020164126 A | 10/2020 | |
| JP | 2021070341 A * | 5/2021 | |
| JP | 7141863 B2 * | 9/2022 | B60C 11/246 |
| WO | WO-2018137920 A1 | 8/2018 | |

OTHER PUBLICATIONS

An Office Action in corresponding JP Application No. 2021-151417 dated Jan. 4, 2022 with English translation is attached, 5 pages.
Office Action dated Aug. 2, 2022 in JP Application No. 2019-069249, 5 pages.
International Preliminazry Report on Patentability dated Oct. 14, 2021 in PCT/JP2020/011560, 14 pages.
International Search Report dated Jun. 16, 2020 in PCT/JP2020/011560, 7 pages.

* cited by examiner

ARITHMETIC MODEL GENERATION SYSTEM, WEAR AMOUNT ESTIMATION SYSTEM, AND ARITHMETIC MODEL GENERATION METHOD

CROSS-REFERENCE TO RELATED APPLICATION

This application is a continuation of application No. PCT/JP2020/011560, filed on Mar. 16, 2020, and claims the benefit of priority from the prior Japanese Patent Application No. 2019-069249, filed on Mar. 29, 2019, the entire contents of which are incorporated herein by reference.

BACKGROUND OF THE INVENTION

1. Field of the Invention

The present invention relates to an arithmetic model generation system, a wear amount estimation system, and an arithmetic model generation method.

2. Description of the Related Art

Generally, wear of a tire progresses depending on the traveling condition, travel distance, etc. These days, products provided with a sensor on the tire for measuring the pressure and temperature of the tire and displaying the pressure and temperature measured are commercialized.

JP2018-158722 A discloses a tire wear estimation system according to the related art. The tire wear estimation system includes: at least one sensor affixed to the tire to generate a first predictor; at least one of a lookup table and a database storing data for a second predictor; one of the predictors including at least one vehicle effect; and a model receiving the predictors and generating an estimated wear rate for the at least one tire.

SUMMARY OF THE INVENTION

The tire wear estimation system disclosed in JP2018-158722 A estimates tire wear rate by using a wheel position and drivetrains as the vehicle effect. We have realized that the impact of wheel position and drivetrains on tire wear varies depending on the vehicle type, and, in the case of large vehicles like trucks, for example, the wheel position and drivetrains are not necessarily factors with great impact so that there is room for improvement in estimation of tire wear. In other words, it is necessary, for more accurate estimation of tire wear amount, to allow for factors like turns made while the vehicle is traveling, and, additionally, the timing of acquisition of input data in wear estimation.

The present invention addresses the issue and a purpose thereof is to provide an arithmetic model generation system, a wear amount estimation system, and an arithmetic model generation method capable of estimating the tire wear amount accurately.

An embodiment of the present invention relates to an arithmetic model generation system. The arithmetic model generation system includes: a tire information acquisition unit that acquires tire data including a temperature and pressure of a tire; a position information acquisition unit that acquires position data for a vehicle on which the tire is mounted; a wear amount calculator that includes an arithmetic model that calculates a tire wear amount based on the temperature, pressure, and position, the wear amount calculator calculating a wear amount of the tire by using the arithmetic model by inputting the tire data and the position data corresponding to the tire data; and an arithmetic model update unit that compares the wear amount measured in the tire with the wear amount calculated by the wear amount calculator and updates the arithmetic model accordingly.

Another embodiment of the present invention relates to a wear amount estimation system. The wear amount estimation system includes: a tire information acquisition unit that acquires tire data including a temperature and pressure of the tire; a position information acquisition unit that acquires position data for a vehicle on which the tire is mounted; a wear amount calculator that includes an arithmetic model that calculates a tire wear amount based on the temperature, pressure, and position, the wear amount calculator calculating a wear amount of the tire by using the arithmetic model by inputting the tire data and the position data corresponding to the tire data.

Another embodiment of the present invention relates to an arithmetic model generation method. The arithmetic model generation method includes: acquiring tire data including a temperature and pressure of the tire; acquiring position data for a vehicle on which the tire is mounted; calculating a wear amount of the tire based on an arithmetic model that calculates a tire wear amount based on the temperature, pressure, and position, using the arithmetic model by inputting the tire data and the position data corresponding to the tire data; and comparing the wear amount measured in the tire with the wear amount calculated by the calculating, and updating the arithmetic model accordingly.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
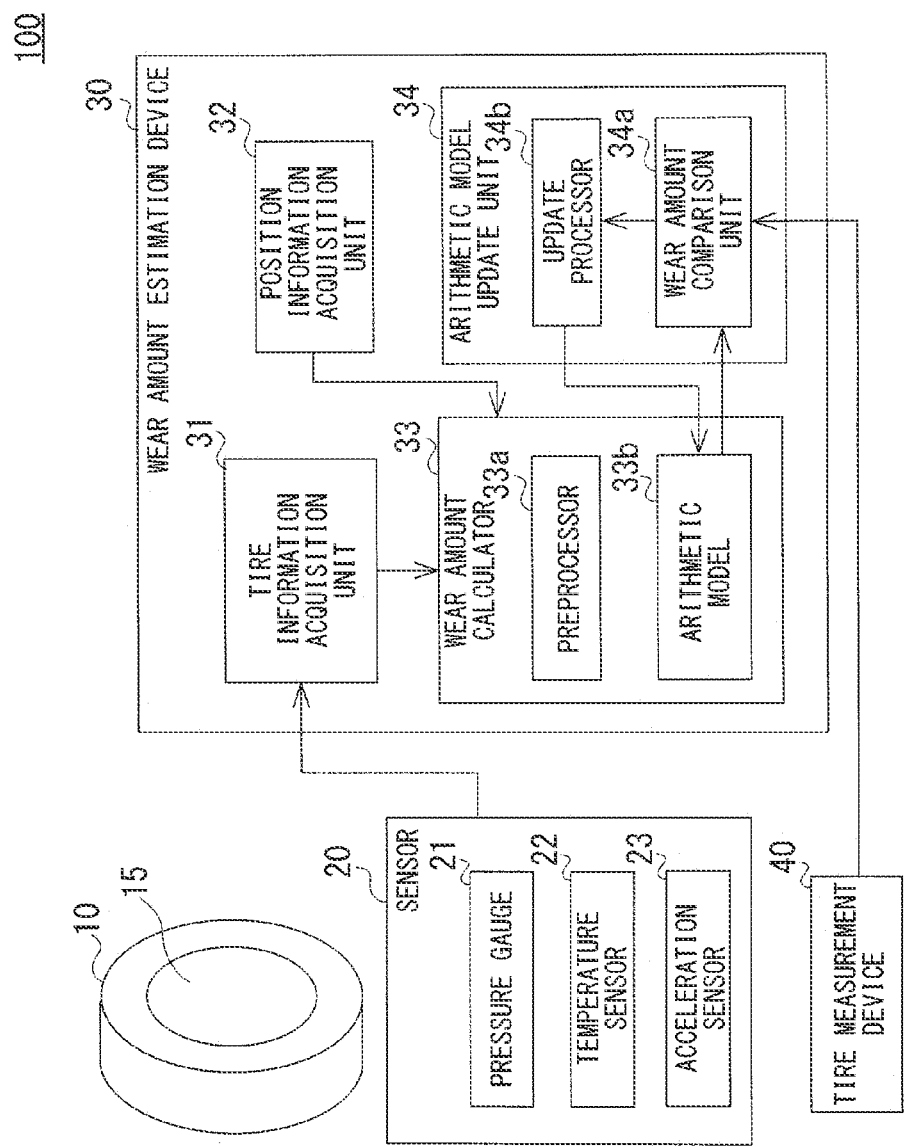
FIG. 1 is a block diagram illustrating a functional configuration of an arithmetic model generation system according to embodiment 1.

The invention will now be described by reference to the preferred embodiments. This does not intend to limit the scope of the present invention, but to exemplify the invention.

Hereinafter, the invention will be described based on preferred embodiments with reference to FIGS. 1 through 5. Identical or like constituting elements and members shown in the drawings are represented by identical symbols and a duplicate description will be omitted as appropriate. The dimension of members in the drawings shall be enlarged or reduced as appropriate to facilitate understanding. Those of the members that are not important in describing the embodiment are omitted from the drawings.

Embodiment 1

FIG. 1 is a block diagram illustrating a functional configuration of an arithmetic model generation system 100 according to embodiment 1. The arithmetic model generation system 100 calculates the tire wear amount by using an arithmetic model 33b, based on the air pressure and temperature measured by a sensor 20 provided in a tire 10 and position information acquired by a position information acquisition unit 32. The arithmetic model generation system 100 increases accuracy of the arithmetic model 33b by using a learning type model such as a neural network as the arithmetic model, using the tire wear amount actually measured in the tire 10 as training data, and repeating learning by executing calculation and updating the arithmetic model. A wear amount estimation device 30 functions as a device that estimates the tire wear amount after the arithmetic model has been trained.

For a tire 10 having certain specifications, the arithmetic model generation system 100 can train the arithmetic model by running a vehicle on which the tire 10 is mounted. The tire specifications include, for example, information on tire performance such as a manufacturer, a product name, a tire size, a tire width, flatness, a tire strength, static rigidity, dynamic rigidity, a tire outer diameter, a road index, and a date of manufacture.

The arithmetic model generation system 100 may construct the arithmetic model 33b to which measurement data for acceleration generated in the tire 10 is input in addition to the air pressure and temperature of the tire 10. The acceleration generated in the tire 10 is, for example, triaxial acceleration in the radial direction, axial direction, and longitudinal direction of the tire 10, and the triaxial acceleration is input to the arithmetic model 33b. Alternatively, biaxial acceleration in the radial direction and the axial direction of the tire 10 may, for example, be input to the arithmetic model 33b.

A pressure gauge 21, a temperature sensor 22, and an acceleration sensor 23 are provided in the tire 10. The pressure gauge 21 and the temperature sensor 22 are provided in, for example, the air valve of the tire 10 and respectively measure the air pressure and temperature of the tire 10. The temperature sensor 22 may be provided in the inner line of the tire 10. The acceleration sensor 23 is provided in, for example, the tire 10, the wheel, etc. and measures the acceleration generated in the tire 10. An RFID, etc. to which, for example, unique identification information is assigned to may be mounted on the tire 10 in order to identify each tire.

The wear amount estimation device 30 includes a tire information acquisition unit 31, a position information acquisition unit 32, a wear amount calculator 33, and an arithmetic model update unit 34. The wear amount estimation device 30 is an information processing device such as a PC (personal computer). The units in the wear amount estimation device 30 can be realized in hardware by an electronic element such as a CPU of a computer or a machine part, and in software by a computer program and the like. Here, functional blocks realized through collaboration among them are described. Accordingly, those skilled in the art will understand that these functional blocks can be realized in various forms by a combination of hardware and software.

The tire information acquisition unit 31 acquires tire data from the pressure gauge 21, the temperature sensor 22, and the acceleration sensor 23 by wireless communication, etc. and outputs the tire data to the wear amount calculator 33, the tire data including the air pressure, temperature, and acceleration measured in the tire 10, and the point of time of measurement. The position information acquisition unit 32 acquires position data and outputs the position data to the wear amount calculator 33, the position data including the position of a vehicle on which the tire 10 is mounted calculated by a GPS receiver etc. and the point of time of calculation.

The wear amount calculator 33 includes a preprocessor 33a and an arithmetic model 33b. The preprocessor 33a maps the tire data acquired by the tire information acquisition unit 31 to the position data acquired by the position information acquisition unit 32 such that data occurring at the same point of time or within a predetermined time difference is mapped to each other. Further, the preprocessor 33a determines, by interpolation, the position of the vehicle at a point of time corresponding to the point of time included in, for example, the tire data acquired.

Further, the preprocessor 332 calculates the travel distance, speed, and radius of turn of the vehicle based on the position data input from the position information acquisition unit 32. The preprocessor 33a acquires position data minute by minute from the position information acquisition unit 32 and can determine the travel distance based on the position data since the start of travel up to the current point of time and determine the speed and radius of turn based on the time change of the position data. Notwithstanding, the radius of turn may be calculated based on information from a steering angle sensor of a steering mechanism.

Figure 2:
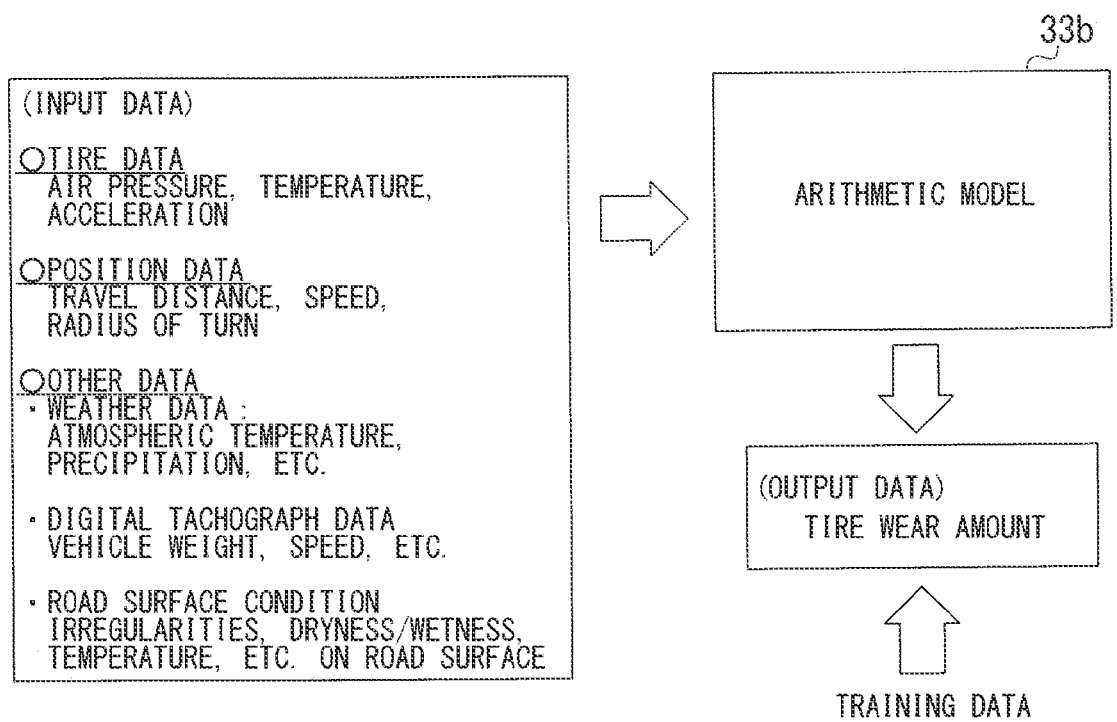
FIG. 2 is a schematic diagram for explaining learning in the arithmetic model.

FIG. 2 is a schematic diagram for explaining learning in the arithmetic model 33b. The input data for the arithmetic model 33b includes tire data including the air pressure, temperature, and acceleration, and the travel distance, speed, radius of turn, etc. calculated by based on the position data. Besides, weather data, data of a digital tachograph mounted on the vehicle, and information on the road surface condition may be used as the input data. As regards weather data, the atmospheric temperature, precipitation, etc. in the area traveled may for example be used as the input data input for the arithmetic model 33b. As regards digital tachograph data, the vehicle weight, speed data, etc. may for example be used as the input data for the arithmetic model 33b. As regards information on the road surface condition, conditions such as irregularities, temperature, dryness/wetness on the road surface on which the vehicle is traveling may be used as the input data for the arithmetic model 33b.

For example, a learning type model such as a neural network is used as the arithmetic model 33b. The arithmetic model 33b inputs the travel distance, speed, radius of turn, etc. to a node of an input layer, and executes calculation using a path provided with a weight from the input layer to an intermediate layer. The arithmetic model 33b further performs calculation using a path provided with a weight from the intermediate layer to an output layer, and outputs the tire wear amount from a node of the output layer. In the learning type model such as a neural network, a non-linear operation may be executed using an activation function in addition to a linear operation.

The arithmetic model update unit 34 compares the calculated tire wear amount with the training data to update the arithmetic model 33b. The arithmetic model update unit 34 includes a wear amount comparison unit 34a and an update processor 34b. The wear amount comparison unit 34a compares the tire wear amount calculated by the arithmetic model 33b with the tire wear amount measured as the training data by a tire measurement device 40 and outputs an error to the update processor 34b.

The update processor 34b updates a path weight on the arithmetic model based on an error in the wear amount calculated by the arithmetic model 33b. The accuracy of the arithmetic model is increased by repeating the calculation of the tire wear amount by the arithmetic model 33b, the comparison with the training data by the wear amount comparison unit 34a, and the update of the arithmetic model by the update processor 34b.

The tire measurement device 40 directly measures a depth of a groove provided on a tread of the tire 10. It is also possible that a worker measures the depth of each groove by a measuring instrument, a camera, visual inspection and the like, and the tire measurement device 40 may store the measurement data input by the worker. The tire measurement device 40 may also be a dedicated measurement device that measures the depth of a groove by a mechanical or optical method and stores the depth. Given four tire grooves, for example, the tire measurement device 40 performs measurements at four locations in the width direction and, further, at three locations in the same groove in the circumferential direction (e.g., at the intervals of 120°). This causes uneven wear amount data in the width direction or circumferential direction of the tire to be also stored in the tire measurement device 40. Since the tire diameter may change due to wear, the tire measurement device 40 may indirectly measure the depth of a groove by calculation from the travel distance and information on the revolutions and speed of the tire. In addition, direct measurement of the depth of a groove and calculation-based prediction of the depth from the travel distance and information on the revolutions and speed of the tire may be used in combination.

Figure 3:
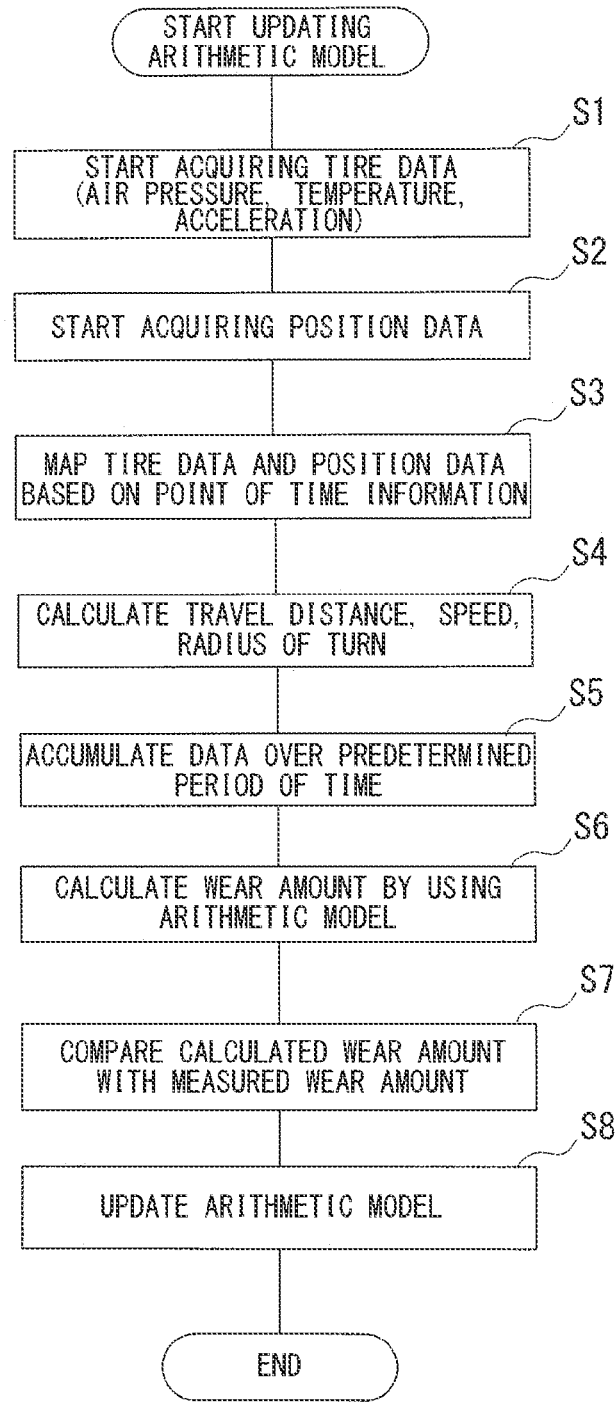
FIG. 3 is a flowchart showing a procedure for generating the arithmetic model by the arithmetic model generation system.

The operation of the arithmetic model generation system 100 will now be described. FIG. 3 is a flowchart showing a procedure for generating the arithmetic model by the arithmetic model generation system 100. The wear amount estimation device 30 uses the tire information acquisition unit 31 to start acquiring tire data from the pressure gauge 21, the temperature sensor 22, and the acceleration sensor 23, the tire data including the air pressure, temperature, and acceleration measured in the tire 10 (S1). Further, the position information acquisition unit 32 is used to start acquiring the position data (S2). The preprocessor 33a maps the tire data to the position data such that data occurring at the same point of time or within a predetermined time difference is mapped to each other, based on the point of time information included in the respective data (S3). The preprocessor 33a also calculates the travel distance, speed, and radius of turn based on the position data (S4).

The preprocessor 33a accumulates the data over a predetermined period of time (S5). The predetermined period of time may be a period of time for which the vehicle is driven at a time, or several days or one week, although these should be construed as limiting the scope. The preprocessor 33a inputs the data to the arithmetic model 33b after the predetermined period of time has elapsed to estimate the tire wear amount (S6). The wear amount comparison unit 34a compares the tire wear amount calculated by the arithmetic model 33b with the tire wear amount as the training data measured by the tire measurement device 40 (S7). The wear amount comparison unit 34a outputs an error between the tire wear amount calculated by the arithmetic model 33b and the tire wear amount as the training data measured by the tire measurement device 40, which error results from the comparison, to the update processor 34b.

The update processor 34b updates the arithmetic model based on the error in tire wear amount input from the wear amount comparison unit 34a (S8) and terminates the process. The wear amount estimation device 30 repeats these steps to update the arithmetic model, thereby increasing the accuracy of estimation of the tire wear amount.

As described above, the arithmetic model generation system 100 can calculate traveling condition such as the travel distance, speed, radius of turn of the vehicle from the position data for the vehicle on which the tire 10 is mounted. These traveling condition are major factors in estimation of tire wear amount. The arithmetic model generation system 100 can generate an arithmetic model that estimates the tire wear amount accurately, by generating the arithmetic model according to the air pressure and temperature of the tire 10, and the travel distance, speed, radius of turn, etc. based on the position data for the vehicle. The arithmetic model generation system 100 also trains the arithmetic model 33b on uneven wear. Therefore, the arithmetic model generation system 100 can also acquire data such as traveling route, acceleration, and deceleration and predict uneven wear of the tires based on the position data as well as on the travel distance of the vehicle. This makes it possible to propose a rotation to suit the condition of uneven wear of the tires of the vehicle.

The arithmetic model generation system 100 also maps the input data for the arithmetic model 33b such that the tire data and the position data occurring at the same point of time or within a predetermined time difference are mapped to each other, based on the point of time information included in the data. Given, for example, that there is a time difference of 1 second between the point of time when the tire data is acquired and the point of time when the position data is acquired and that the vehicle is traveling at 60 km per hour, the vehicle will have traveled 16.7 m in the time difference of 1 second, creating a gap between the points of time that the tire data and the position data are acquired.

It is preferred that the tire data and the position data are acquired within a time difference of about 0.1 second, although this depends on the average traveling speed of the vehicle. By mapping the tire data and the position data occurring at the same point of time or within a predetermined time difference to each other based on the point of time information included in the respective data, the arithmetic model generation system 100 can align the points of time of acquisition of the tire data and the position data.

Further, if the arithmetic model generation system 100 cannot acquire the tire data and the position data at the same point of time or within a predetermined time difference, the arithmetic model generation system 100 may subject at least one of the tire data and the position data to data interpolation based on the point of time. The arithmetic model generation system 100 can align the points of time of the tire data and the position data and generate an arithmetic model that estimates the tire wear amount more accurately by subjecting the data to data interpolation based on the points of time of acquisition of the respective data.

Embodiment 2

Figure 4:
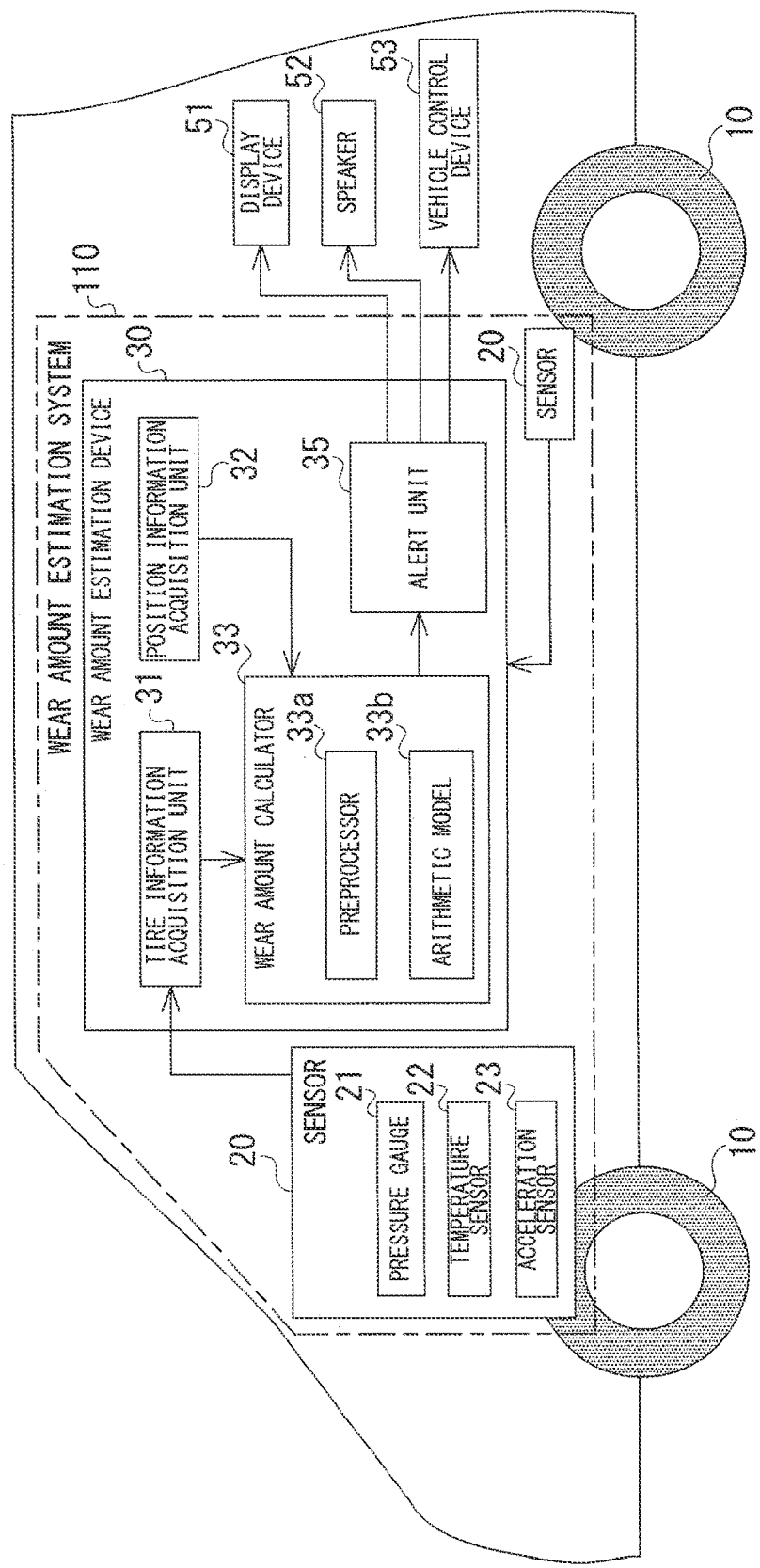
FIG. 4 is a block diagram illustrating a functional configuration of a wear amount estimation system according to embodiment 2.

FIG. 4 is a block diagram illustrating a functional configuration of a wear amount estimation system 110 according to the embodiment 2. Once the arithmetic model 33b that estimates the tire wear amount is generated by the arithmetic model generation system 100 according to embodiment 1 as described above, it is possible to construct the wear amount estimation device 30 provided with the arithmetic model 33b. The wear amount estimation system 110 includes the sensor 20 and the wear amount estimation device 30 and uses the arithmetic model 33b constructed by the arithmetic model generation system 100 to estimate the wear amount of the tire 10 mounted on the vehicle accurately.

The wear amount estimation device 30 includes the tire information acquisition unit 31, the position information acquisition unit 32, the wear amount calculator 33, and an alert unit 35 and can be mounted on the vehicle for use. The tire information acquisition unit 31 and the position information acquisition unit 32 have the same function and working as those of embodiment 1, and a description thereof is omitted for brevity.

The wear amount calculator 33 uses, as the arithmetic model 33b, the arithmetic model generated by the arithmetic model generation system 100 according to embodiment 1. The wear amount calculator 33 may calculate the tire wear amount after integrating the data acquired by the tire information acquisition unit 31 and the position information acquisition unit 32 over a predetermined period of time. Alternatively, the wear amount calculator 33 may calculate the tire wear amount minute by minute at the point of time of acquisition.

The preprocessor 33a has the same function and working as those of embodiment 1. The preprocessor 33a calculates traveling conditions such as the travel distance, speed, radius of turn, etc. from the position data and uses the calculated data as the input data for the arithmetic model 33b. The preprocessor 33a also maps the tire data and the position data occurring at the same point of time or within a predetermined time difference to each other based on the point of time information included in the respective data and subjects the data to data interpolation based on the point of time of acquisition of the data as necessary.

To let a passenger (e.g., the driver) of the vehicle know the current tire wear amount, the alert unit 35 alerts the passenger of the tire wear amount by displaying the amount on a display device 51, outputting an sound from a speaker 52, etc. Alternatively, the alert unit 35 may alert a vehicle control device 53 mounted on the vehicle of the current tire wear amount. The vehicle control device 53 can perform vehicle control such as automatic driving and collision avoidance based on the current tire wear amount.

Variation

Figure 5:
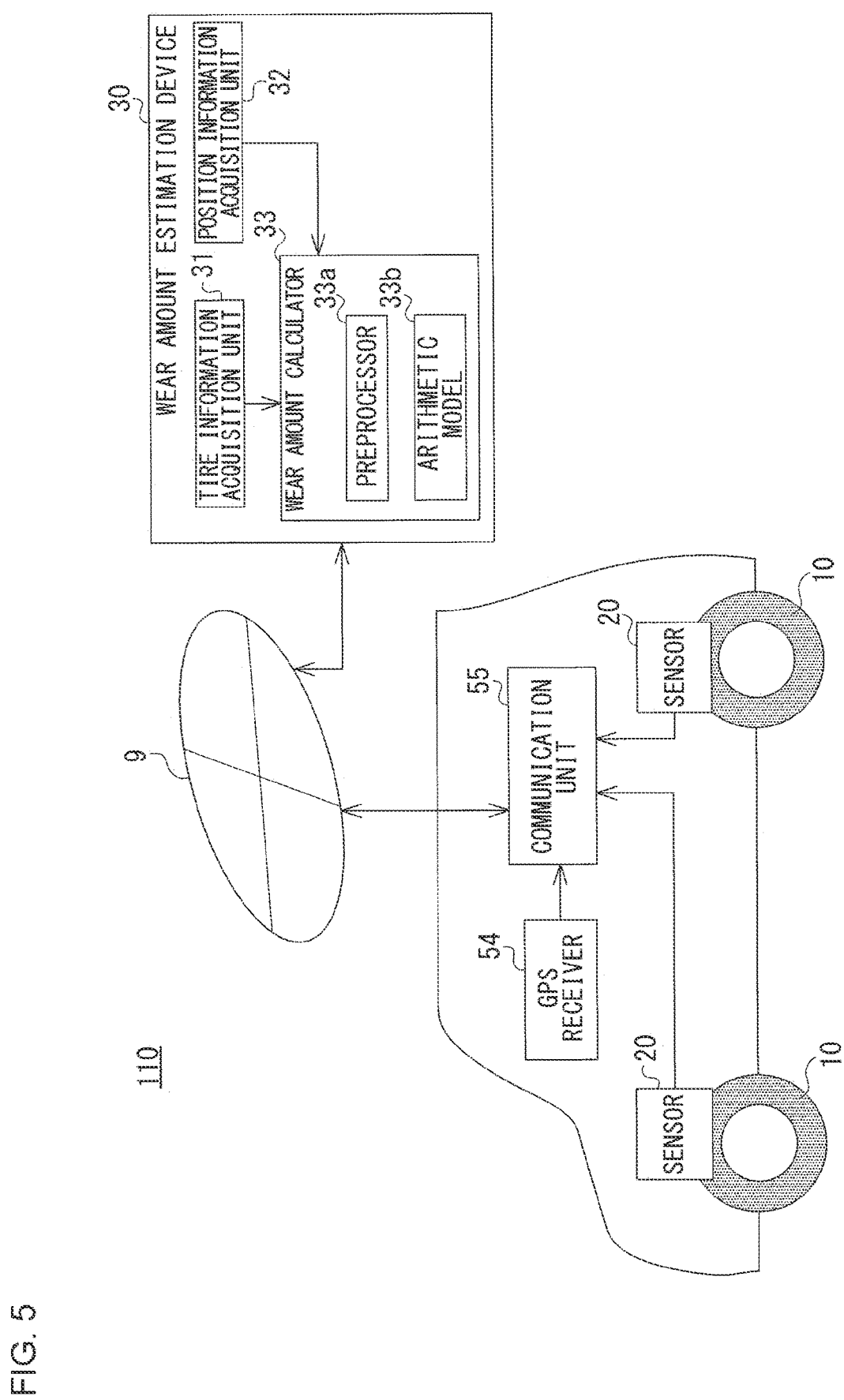
FIG. 5 is a block diagram illustrating a functional configuration of the wear amount estimation system according to a variation.

FIG. 5 is a block diagram illustrating a functional configuration of the wear amount estimation system 110 according to a variation. The wear amount estimation system 110 according to the variation communicates with a communication network 9 by using a communication unit 55 mounted on the vehicle and transmits the tire data measured by the sensor 20 and the position data for the vehicle acquired by a GPS receiver 54. The wear amount estimation device 30 receives the tire data and the position data transmitted from the vehicle via the communication network 9 and estimates the tire wear amount.

The wear amount estimation device 30 have the same function and working as those of embodiment 2. The tire information acquisition unit 31 acquires the tire data from the received data, and the position information acquisition unit 32 acquires the position data from the received data. The tire information acquisition unit 31 and the position information acquisition unit 32 may be integrated as an information acquisition unit for acquiring tire data and position data.

In the wear amount estimation system 110 according to the variation, the wear amount estimation device 30 can be provided as a device distanced from the vehicle to estimate, for example, the tire wear amount in a plurality of vehicles. Further, the wear amount estimation device 30 may communicate the current tire wear amount to the vehicle or an operation manager who manages the vehicle at a transportation company. The vehicle can receive the tire wear amount transmitted from the wear amount estimation device 30 to let a passenger (e.g., the driver) of the vehicle know the tire wear amount or to notify the vehicle control device.

In the embodiments and variation described above, unique information may be added for each tire 10 to construct the arithmetic model 33b. The tire 10 has unique specification information such as tire size, tire width, flatness, tire strength, static rigidity, dynamic rigidity, tire outer diameter, road index, etc. These items of information are input as parameters in the arithmetic model 33b to estimate the tire wear amount.

A description will now be given of the features of the arithmetic model generation system 100, the wear amount estimation system 110, and the arithmetic model generation method according to the embodiments and the variation. The arithmetic model generation system 100 includes the tire information acquisition unit 31, the position information acquisition unit 32, the wear amount calculator 33, and the arithmetic model update unit 34. The tire information acquisition unit 31 acquires the tire data including the temperature and pressure of the tire 10. The position information acquisition unit 32 acquires the position data for the vehicle on which the tire 10 is mounted. The wear amount calculator 33 has the arithmetic model 33b for calculating the tire wear amount based on the temperature, pressure, and position, the wear amount calculator calculating a wear amount of the tire 10 by using the arithmetic model 33b by inputting the tire data and the position data corresponding to the tire data. The arithmetic model update unit 34 compares the wear amount measured in the tire 10 with the wear amount calculated by the wear amount calculator 33 and updates the arithmetic model 33b accordingly. This allows the arithmetic model generation system 100 to generate an arithmetic model that estimates the tire wear amount accurately.

Further, the tire information acquisition unit 31 acquires the tire data including the point of time of acquisition of the temperature and pressure of the tire 10. The position information acquisition unit 32 acquires the position data including the point of time of acquisition of the position of the vehicle. This allows the arithmetic model generation system 100 to map the tire data and the position data in the time domain based on the information on the point of time included in the tire data and the position data.

Further, the tire data and the position data are acquired within a predetermined time difference. This allows the arithmetic model generation system 100 to generate an arithmetic model that estimates the tire wear amount accurately.

Further, the wear amount calculator 33 subjects at least one of the tire data and the position data to data interpolation based on the point of time. This allows the arithmetic model generation system 100 to align the timing by data interpolation even if there is a gap between the points of time of acquisition of the respective data and to use the data as the input data for the arithmetic model 33b.

Further, the tire data includes the acceleration measured by the acceleration sensor 23 provided in the tire 10, and the wear amount calculator 33 calculates the tire wear amount by also inputting the acceleration measured in the tire 10 to the arithmetic model 33b. This allows the arithmetic model generation system 100 to generate an arithmetic model that estimates the tire wear amount that allows for the impact from irregularities on the road surface, etc.

Further, the arithmetic model 33b calculates the uneven wear amount of the tire 10. This allows the arithmetic model generation system 100 to provide an arithmetic model that estimates the uneven wear amount of the tire 10 for tire rotation.

Further, the wear amount calculator 33 inputs the position data or weather data to the arithmetic model to calculate the tire wear amount. This allows the arithmetic model generation system 100 to generate an arithmetic model that includes the weather data as the input data and estimates the tire wear amount accordingly.

The wear amount estimation system 110 includes the tire information acquisition unit 31, the position information acquisition unit 32, and the wear amount calculator 33. The tire information acquisition unit 31 acquires the tire data including the temperature and pressure of the tire 10. The position information acquisition unit 32 acquires the position data for the vehicle on which the tire 10 is mounted. The wear amount calculator 33 includes the arithmetic model 33b that calculates the tire wear amount based on the temperature, pressure, and position, the wear amount calculator calculating the wear amount of the tire 10 by using the arithmetic model 33b by inputting the tire data and the position data corresponding to the tire data. This allows the wear amount estimation system 110 to estimate the tire wear amount accurately based on the travel distance, speed, and radius of turn calculated based on, for example, the position data for the vehicle.

The arithmetic model generation method includes a tire information acquisition step, a position information acquisition step, a wear amount calculation step, and an arithmetic model update step. The tire information acquisition step acquires the tire data including the temperature and pressure of the tire 10. The position information acquisition step acquires position data for the vehicle on which the tire 10 is mounted. The wear amount calculation step calculates the wear amount of the tire 10 based on the arithmetic model 33b that calculates the tire wear amount based on the temperature, pressure, and position, using the arithmetic model 33b by inputting the tire data and the position data corresponding to the tire data. The arithmetic model update step compares the wear amount measured in the tire 10 with the wear amount calculated by the wear amount calculation step and updates the arithmetic model 33b accordingly. According to the arithmetic model generation method, an arithmetic model that estimates the tire wear amount accurately can be generated.

Described above is an explanation based on an exemplary embodiment. The embodiments are intended to be illustrative only and it will be understood by those skilled in the art that variations and modifications are possible within the claim scope of the present invention and that such variations and modifications are also within the claim scope of the present invention. Accordingly, the description and drawings in the specification shall be interpreted as being illustration instead of limitation.

What is claimed is:

1. An arithmetic model generation system comprising:
a tire information acquisition unit that acquires tire data including a temperature and pressure of a tire;
a position information acquisition unit that acquires position data for a vehicle on which the tire is mounted;
a wear amount calculator that includes an arithmetic model that generates an estimated wear amount of at least one groove of the tire, the wear amount calculator calculating the estimated wear amount of at least one groove of the tire by using the arithmetic model by inputting the tire data and the position data; and
an arithmetic model update unit that updates the arithmetic model based on a wear amount measured by a tire measurement device external to the vehicle and the estimated wear amount.

2. The arithmetic model generation system according to claim 1, wherein
the tire information acquisition unit acquires the tire data including a point of time of measurement of the temperature and pressure of the tire, and
the position information acquisition unit acquires the position data including a point of time of measurement of a position of the vehicle.

3. The arithmetic model generation system according to claim 2, further comprising;
a preprocessor that associates the tire data with the position data that are acquired within a predetermined time difference.

4. The arithmetic model generation system according to claim 2, wherein
the wear amount calculator subjects at least one of the tire data and the position data to data interpolation based on the point of time.

5. The arithmetic model generation system according to claim 1, wherein
the tire data also includes an acceleration measured by an acceleration sensor provided in the tire, and the wear amount calculator generates the estimated tire wear amount by also inputting the acceleration to the arithmetic model.

6. The arithmetic model generation system according to claim 1, wherein
the arithmetic model also generates an uneven wear amount of the tire.

7. The arithmetic model generation system according to claim 1, wherein
the arithmetic model also receives the position data or weather data to calculate the estimated wear amount.

8. A wear amount estimation system comprising:
a tire information acquisition unit that acquires tire data including a temperature and pressure of a tire;
a position information acquisition unit that acquires position data for a vehicle on which the tire is mounted;
a wear amount calculator that includes an arithmetic model that receives the tire data and the position data corresponding to the tire data and generates an estimated wear amount of at least one groove of the tire.

9. The wear amount estimation system according to claim 8, wherein the wear amount calculator further comprising;
a preprocessor that receives the position data corresponding to the tire data and generates at least one of a travel distance, speed, and radius of turn of the vehicle.

10. An arithmetic model generation method comprising:
acquiring tire data including a temperature and pressure of a tire;
acquiring position data for a vehicle on which the tire is mounted;

calculating an estimated wear amount of the tire based on an arithmetic model that receives the tire data and position data corresponding to the tire data and calculates a tire wear amount; and updating the arithmetic model based on a wear amount measured by a tire measurement device external to the vehicle and the estimated wear amount.

\* \* \* \* \*